(12) United States Patent
Vialen et al.

(10) Patent No.: US 8,774,032 B2
(45) Date of Patent: *Jul. 8, 2014

(54) INTEGRITY CHECK IN A COMMUNICATION SYSTEM

(75) Inventors: Jukka Vialen, Espoo (FI); Valtteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 259 days.

This patent is subject to a terminal disclaimer.

(21) Appl. No.: 13/196,861

(22) Filed: Aug. 2, 2011

(65) Prior Publication Data

US 2012/0051225 A1    Mar. 1, 2012

Related U.S. Application Data

(63) Continuation of application No. 11/314,537, filed on Dec. 22, 2005, now Pat. No. 8,014,307, which is a continuation of application No. 09/975,410, filed on Oct. 10, 2001, now Pat. No. 7,009,940, which is a continuation of application No. PCT/EP01/00735, filed on Jan. 23, 2001.

(30) Foreign Application Priority Data

Feb. 22, 2000  (GB) .................................. 0004178.0

(51) Int. Cl.
*H04L 12/28* (2006.01)
*H04J 1/16* (2006.01)

(52) U.S. Cl.
USPC ........... 370/252; 370/278; 370/282; 370/386; 709/222

(58) Field of Classification Search
USPC .................. 370/252, 278, 282, 386; 713/200; 709/222

See application file for complete search history.

(56) References Cited

U.S. PATENT DOCUMENTS

| 6,693,892 B1 * | 2/2004 | Rinne et al. | 370/348 |
| 2009/0191924 A1 * | 7/2009 | Tamura et al. | 455/571 |

* cited by examiner

*Primary Examiner* — John Pezzlo
(74) *Attorney, Agent, or Firm* — Mintz, Levin, Cohen, Ferris, Glovsky & Popeo, P.C.

(57) ABSTRACT

A method of communication between a first node and a second node for a system where a plurality of different channels is provided between said first and second node. The method comprises the step of calculating an integrity output. The integrity output is calculated from a plurality of values, some of said values being the same for said different channels. At least one of said values is arranged to comprise information relating to the identity of said channel, each channel having a different identity. After the integrity output has been calculated, Information relating to the integrity output is transmitted from one of said nodes to the other.

13 Claims, 7 Drawing Sheets

INTEGRITY CHECK IN A COMMUNICATION SYSTEM

CROSS REFERENCE TO RELATED APPLICATION

This application is a continuation application of U.S. patent application Ser. No. 11/314,537 filed on Dec. 22, 2005, entitled "Integrity Check In A Communication System", which claims the benefit of U.S. patent application Ser. No. 09/975,410 filed on Oct. 10, 2001 and PCT Patent Application Serial No. PCT/EP01/00735 filed on Jan. 23, 2001, contents of the aforementioned applications are hereby incorporated by reference in their entirety.

FIELD OF THE INVENTION

The present invention relates to a method for checking the integrity of communications between a first node and a second node. In particular, but not exclusively, the invention relates to a method for checking the integrity of communications between a mobile station and a cellular network.

BACKGROUND TO THE INVENTION

Various different telecommunication networks are known. A telecommunication network is a cellular telecommunication network, wherein the area covered by the network is divided into a plurality of cells. Each cell is provided with a base station, which serves mobile stations in the cell associated with the base station. User equipment, such as mobile stations, thus receive signals from and transmit signals to the base station, and thereby may communicate through the base stations. The cellular system also typically comprises a base station controller controlling the operation of one or more base stations. At least some of the user equipment in the system may be able to communicate simultaneously on one or more communication channels.

Telecommunications are subject to the problem of ensuring that the received information is sent by an authorised sender and not by an unauthorised party who is trying to masquerade as the sender. The problem is especially relevant to cellular telecommunication systems, where the air interface presents an potential opportunity for an unauthorised party to eavesdrop and replace the contents of a transmission.

One solution to this problem is authentication of the communicating parties. An authentication process aims to discover and check the identity of both communicating parties, so that each party receives information about the identity of the other party, and can trust the identity. Authentication is typically performed in a specific procedure at the beginning of a connection. However, this procedure leaves room for the unauthorized manipulation, insertion, and deletion of subsequent messages. There is a need for separate authentication of each transmitted message. This can be done by appending a message authentication code (MAC-I) to the message at the transmitting end, and checking the message authentication code MAC-I value at the receiving end.

A message authentication code MAC-I is typically a relatively short string of bits, which is dependent on the message it protects and on a secret key known both by the sender and by the recipient of the message. The secret key is generated and agreed during the authentication procedure at the beginning of the connection. In some cases the algorithm (that is used to calculate the message authentication code MAC-I based on the secret key and the message) is also secret but this is not usually the case.

The process of authentication of single messages is often called integrity protection. To protect the integrity of a message, the transmitting party computes a message authentication value based on the message to be sent and the secret key using the specified algorithm, and sends the message with the message authentication code MAC-I value. The receiving party recomputes a message authentication code MAC-I value based on the message and the secret key according to the specified algorithm, and compares the received message authentication code MAC-I and the calculated message authentication code MAC-I. If the two message authentication code MAC-I values match, the recipient can trust that the message is intact and sent by the supposed party.

Integrity protection schemes can be attacked. There are two methods that an unauthorised party can use to forge a message authentication code MAC-I value for a modified or a new messages. The first method involves the obtaining of the secret key and the second method involves providing modified or new message without knowledge of the secret key.

The secret key can be obtained by a third party in two ways:
  by computing all possible keys until a key is found, which matches with data of observed message authentication code MAC-I pairs, or by otherwise breaking the algorithm for producing message authentication code MAC-I values; or
  by directly capturing a stored or transmitted secret key.

The original communicating parties can prevent a third party from obtaining the secret key by using an algorithm that is cryptographically strong, by using a long enough secret key to prevent the exhaustive search of all keys, and by using a secure method for the transmission and storage of secret keys.

A third party can try to disrupt messaging between the two parties without a secret key by guessing the correct message authentication code MAC-I value, or by replaying some earlier message transmitted between the two parties. In the latter case, the correct message authentication code MAC-I for the message is known from the original transmission. This attack can be very useful for an unauthorised third party. For instance, it may multiply the number of further actions that are favorable to the intruder. Even money transactions may be repeated this way.

Correct guessing of the message authentication code MAC-I value can be prevented by using long message authentication code MAC-I values. The message authentication MAC-I value should be long enough to reduce the probability of guessing right to a sufficiently low level compared to the benefit gained by one successful forgery. For example, using a 32 bit message authentication code MAC-I value reduces the probability of a correct guess to 1/4294967296. This is small enough for most applications.

Obtaining a correct message authentication code MAC-I value using the replay attack i.e. by replaying an earlier message, can be prevented by introducing a time varying parameter to the calculation of the message authentication MAC-I values. For example, a time stamp value or a sequence number can be used as a further input to the message authentication code MAC-I algorithm in addition to the secret integrity key and the message.

In the case where a sequence of numbers are used as time varying parameters, a mechanism is used which prevents the possibility of using the same sequence number more than once with the same secret key. Typically, both communicating parties keep track of the used sequence numbers.

If there are several communication channels in use which all use the same secret key the following problem arises. A message in one communication channel associated with a given sequence number, for example n, can be repeated on another communicating channel at a suitable time, that is whenever the sequence number n is acceptable on the other channel.

It has been proposed to apply ciphering and integrity protection in the UMTS system for the third generation standard. However the method, which has been proposed, permits the identical message to be sent on two different signalling radio bearers at different times. This makes the system vulnerable to man-in-the-middle attacks. In particular, such a system may be vulnerable to the "replay attack" described above.

Typically, one single repeated signalling message does not give a significant advantage to the unauthorised third party but it is possible that the third party could try to repeat a longer dialogue in order to, for example, set-up an additional call and, thus steal parts of a connection.

SUMMARY OF THE INVENTION

It is an aim of embodiments of the present invention to address one or more of the problems discussed previously.

According to one aspect of the present invention, there is provided a method of communication between a first node and a second node, a plurality of different channels being provided between said first and second node, said method comprising the steps of calculating an integrity output, said integrity output being calculated from a plurality of values, some of said values being the same for said different channels, at least one of said values being arranged to comprise information relating to the identity of said channel, each channel having a different identity, and transmitting information relating to the integrity output from one of said nodes to the other.

A separate input may be provided for said information relating to the identity of the channel. Said information relating to the identity of the channel may be combined with at least one other input value. Said input values may comprise one or more of the following values: an integrity key; a direction value; a fresh value; a message value and a count value. The output of the integrity algorithm may be sent from one node to another. Said communication channels may comprise a radio bearer. Said input values may be input to an algorithm for calculation of said output.

According to another aspect of the present invention, there is provided a method for carrying out an integrity check for a system comprising a first node and a second node, a plurality of communication channels being provided between said first node and said second node, said method comprising calculating an integrity output using a plurality of values, some of said values being the same for said different channels, at least one of said values being arranged to comprise information relating to the identity of said channel, each channel having a different identity.

According to another aspect of the present invention, there is provided a method of communication between a first node and a second node, a plurality of different channels being provided between said first and second node, said method comprising the steps of: calculating an integrity output using a plurality of values, one of said values being an integrity key, each of said channels having a different integrity key; and transmitting information relating to the output of said integrity algorithms from one of said nodes to the other.

According to another aspect of the present invention, there is provided a method of communication between a first node and a second node, a plurality of different channels being provided between said first and second node, said method comprising: triggering an authentication procedure; and calculating a desired number of integrity parameters by the authentication procedure.

According to another aspect of the present invention, there is provided a node, said node for use in a system comprising a said node and a further node, a plurality of different channels being provided between said nodes, said node comprising means for calculating an integrity output, said integrity output being calculated from a plurality of values, some of said values being the same for said different channels, at least one of said values being arranged to comprise information relating to the identity of said channel, each channel having a different identity; and means for transmitting information relating to the integrity output from said node to said further node.

According to another aspect of the present invention, there is provided a node, said node for use in a system comprising said node and a further node, a plurality of different channels being provided between said nodes, said node comprising means for calculating an integrity output, said integrity output being calculated from a plurality of values, some of said values being the same for said different channels, at least one of said values being arranged to comprise information relating to the identity of said channel, each channel having a different identity; and means for comparing information relating to the integrity output calculated by said node with a value calculated by the further node.

According to another aspect of the present invention, there is provided an algorithm for calculating an integrity output for use in a system comprising a node and a further node, a plurality of different channels being provided between said nodes, said algorithm comprising means for calculating an integrity output, said integrity output being calculated from a plurality of values, some of said values being the same for said different channels, at least one of said values being arranged to comprise information relating to the identity of said channel, each channel having a different identity.

Several advantages may be achieved by the embodiments of the invention. In the solution of the present invention, the replay attack may be prevented also in the case when several parallel communication channels are used. An advantage is that the embodiments may be flexibly applied to any system utilising parallel communication channels within one connection. The embodiment of the present invention may enhance user security in communication systems, especially in wireless communication systems. The embodiments may ensure that parallel communication channels within a connection will never use same set of input parameters for calculating the message authentication code MAC-I.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENTS OF THE INVENTION

Figure 1:
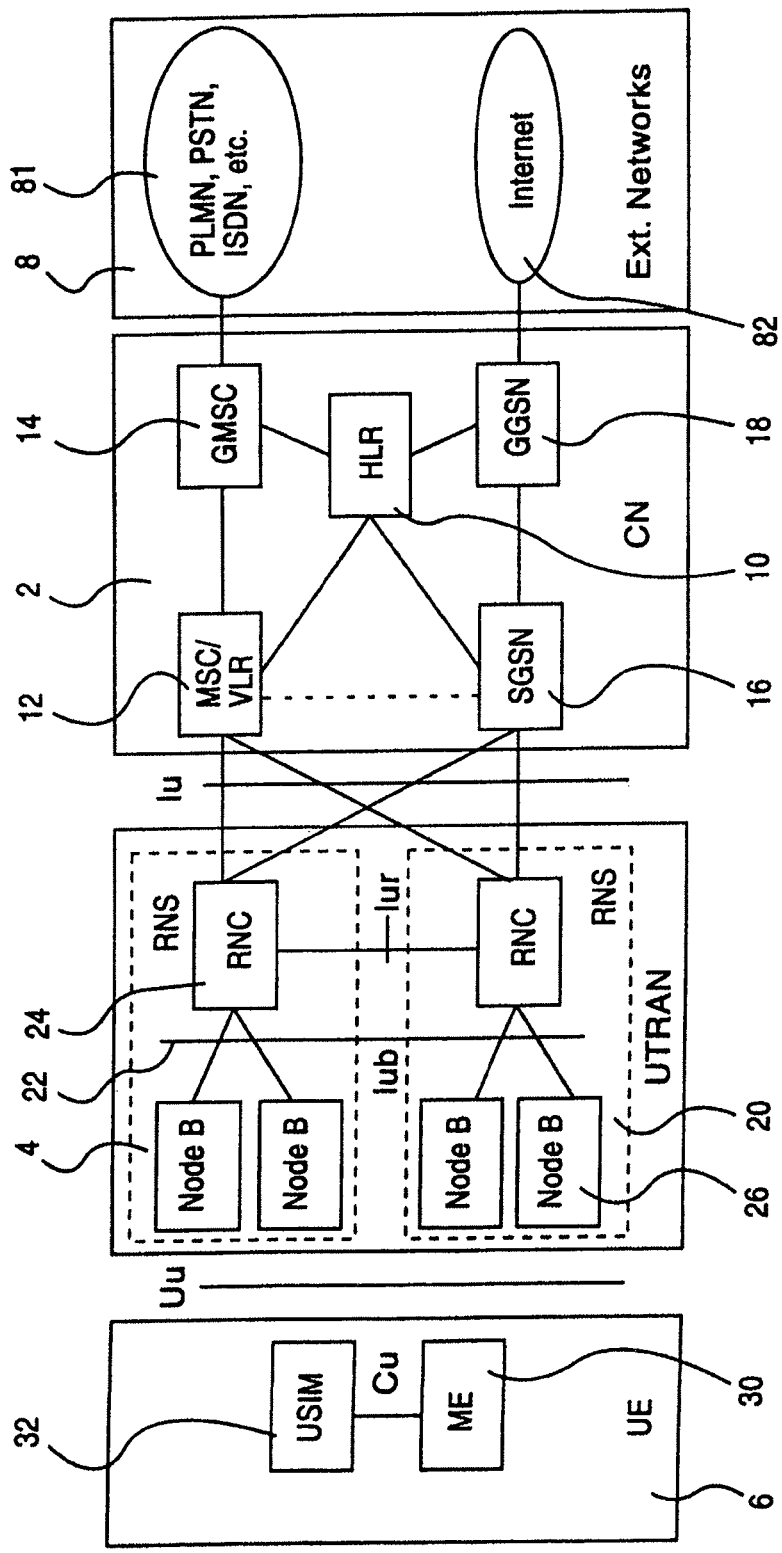
FIG. 1 shows elements of a cellular network with which embodiments of the present invention can be used.

With reference to FIG. 1, a typical mobile telephone system structure will be described. The main parts of the mobile telephone system are: a core network CN 2, a UMTS terrestrial radio access network UTRAN 4, and user equipment UE 6. The core network CN 2 can be connected to external networks 8, which can be either Circuit Switched (CS) networks 81 (e.g. PLMN, PSTN, ISDN) or Packet Switched (PS) networks 82 (e.g. the Internet). The interface between the core network CN 2 and the UMTS terrestrial radio access network UTRAN 4 is called the Iu interface, and the interface between the UMTS terrestrial radio access network UTRAN 4 and the user equipment UE 6 is called the Uu interface. As shown in FIG. 1, the RNC is connected to two CN nodes (MSC/VLR and SGSN). In some network topologies it may be possible that one RNC is connected to one CN node or to more than two CN nodes.

The core network CN 2 is composed of a Home Location Register HLR 10, a Mobile Services Switching Centre/Visitor Location Register MSC/VLR 12, a Gateway MSC GMSC 14, a Serving GPRS (General Packet Radio Service) Support Node SGSN 16 and a Gateway GPRS Support Node GGSN 18.

The UTRAN 4 is composed of radio network subsystems RNS 20 and 22. The interface between two radio network subsystems RNSs is called the Iur interface. The radio network subsystems RNS 20 and 22 are composed of a radio network controller RNC 24 and one or more node Bs 26. The interface between the radio network controller RNC 24 and node B 26 is called the Iub interface.

The Radio Network Controller RNC 24 is the network element responsible for the control of the radio resources of UTRAN 4. The RNC 24 interfaces the core network CN 2 (normally to one MSC 12 and one SGSN 16) and also terminates the Radio Resource Control RRC protocol that defines the messages and procedures between the user equipment UE 6 and UTRAN 4. The RNC 24 logically corresponds to the base station controller of the GSM (global system for mobile communications) standard.

The main function of the Node B 26 is to perform the air interface L1 processing (channel coding and interleaving, rate adaptation, spreading, etc). It also performs some basic Radio Resource Management operation such as the inner loop power control. It logically corresponds to the Base Transceiver Station of the GSM standard.

The user equipment UE 6 consists of two parts: the Mobile Equipment ME 30 and the UMTS Subscriber Identity Module USIM 32. The mobile equipment ME is the radio terminal used for radio communication over the Uu interface between the user equipment UE 6 and the UTRAN 4. The USIM 32 is a smart card that holds the subscriber identity, performs authentication algorithms, and stores authentication and encryption keys and some subscription information that is needed at the terminal.

Figure 2:
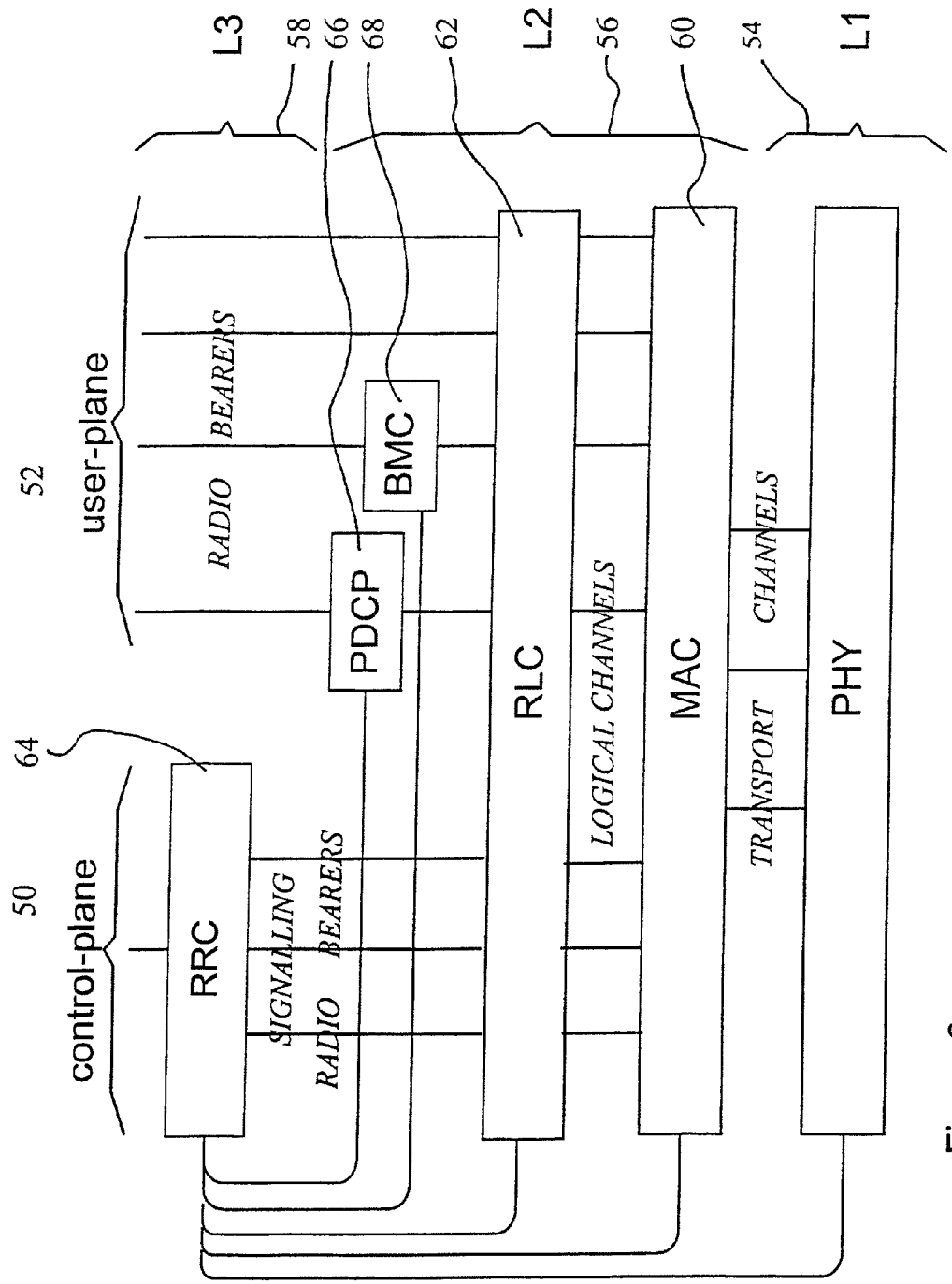
FIG. 2 shows the radio interface Uu protocol architecture between the user equipment UE and Node B and between the user equipment UE and radio network controller RNC of FIG. 1.

With reference to FIG. 2, the radio interface protocol architecture according to the 3GPP specifications will be described. The protocol entities described operate between:

the user equipment UE 6 and NodeB 26 and/or the user equipment UE 6 and the RNC 24.

The division of protocol layers between NodeB 26 and RNC 24 is not described here further.

The radio interface protocols can be divided into a control plane 50 and a user plane 52. The control plane 50 is used for all signaling between the UE 6 and the RNC 24, and also between the user equipment UE 6 and the core network CN 2. The user plane, carries the actual user data. Some of the radio interface protocols operate only in one plane whilst some protocols operate in both planes.

The radio interface protocols can be divided into layers, which are layer 1 L1 54 (also called the physical layer), layer 2 L2 56 (also called the data link layer) and layer 3 L3 58 (also called the network layer). Some layers contain only one protocol whilst some layers contain several different protocols.

The physical layer L1 54 offers services to the Medium Access Control (MAC) layer 60 via transport channels that are characterised by how and with what characteristics the data is transferred.

The Medium Access Control (MAC) layer 60, in turn, offers services to the radio link control RLC layer 62 by means of logical channels. The logical channels are characterized by what type of data is transmitted. In the medium access control MAC layer 60 the logical channels are mapped to the transport channels.

The Radio Link Control RLC 62 layer offers services to higher layers via service access points SAP, which describe how the radio link control RLC layer 62 handles the data packets and if for example an automatic repeat request (ARQ) function is used. On the control plane 50, the radio link control RLC services are used by the radio resource control RRC layer 64 for signalling transport. Normally a minimum of three radio link control RLC 62 entities are engaged to signalling transport—one transparent, one unacknowledged and one acknowledged mode entity. On the user plane 52, the RLC services are used either by the service specific protocol layers—packet data convergence protocol PDCP 66 or broadcast multicast control BMC 68—or by other higher layer user plane functions (e.g. speech codec). The RLC services are called Signalling Radio Bearers in the control plane and Radio Bearers in the user plane for services not utilizing the PDCP or BMC protocols.

The Packet Data Convergence Protocol (PDCP) exists only for the packet switched PS domain services (services routed via the SGSN) and its main function is header compression, which means compression of redundant protocol control information (e.g., TCP/IP and RTP/UDP/IP headers) at the transmitting entity and decompression at the receiving entity. The services offered by PDCP are called Radio Bearers.

The Broadcast Multicast Control protocol (BMC) exists only for the short message service SMS Cell Broadcast service, which is derived from GSM. The service offered by the BMC protocol is also called a Radio Bearer.

The RRC layer 64 offers services to higher layers (to the Non Access Stratum) via service access points. All higher layer signalling between the user equipment UE 6 and the core network CN 2 (mobility management, call control, session management, etc.) is encapsulated into RRC messages for transmission over the radio interface.

The control interfaces between the RRC 64 and all the lower layer protocols are used by the RRC layer 64 to configure characteristics of the lower layer protocol entities including parameters for the physical, transport and logical channels. The same control interfaces are used by the RRC layer 64 e.g. to command the lower layers to perform certain types of measurements and by the lower layers to report measurement results and errors to the RRC.

The embodiment of the invention is described in the context of a UMTS (Universal Mobile Telecommunications System). The present invention is applicable to all types of communication e.g. signalling, real-time services and non-real-time services. However, it should be appreciated that embodiments of the present invention are applicable to any other system.

In the proposal for the UMTS standard for the third generation, the SGSN 16 and the user equipment UE 6, for example a mobile station have an upper layer L3 which supports mobility management MM (sometimes called GMM) and session management SM. This upper layer also supports the short message service SMS. These upper layer L3 protocols are derived from the second generation GPRS system. The SMS supports the mobile-originated and mobile-terminated short message service described in the third generation specification 3GPP TS 23.040. The mobility management function manages the location of the mobile station, that is attachment of the mobile station to the network and authentication. Thus MM supports mobility management functionality such as attach, detach, security (e.g. authentication) and routing updates. In accordance with an embodiment integrity keys may be calculated during authentication procedure of the MM. An exemplifying embodiment of this aspect of the present invention will be explained in more detail later.

The SGSN 16 and RNS 20 have a Radio Access Network Application Protocol (RANAP) layer. This protocol is used to control the Iu-interface bearers, but it also encapsulates and carries higher-layer signalling. RANAP handles the signalling between the SGSN 16 and the RNS 20. RANAP is specified in the third generation specification 3GPP TS 25.413. The mobile station 6 and the RNS 20 both have a radio resource control protocol RRC which provides radio bearer control over the radio interface, for example for the transmission of higher layer signalling messages and SMS messages. This layer handles major part of the communication between the mobile station 6 and the RNC 24. A RRC is specified, for example, in the third generation specification 3GPP TS 25.331

MM, SM and SMS messages are sent from the SGSN 16 to the RNS 20 encapsulated into a RANAP protocol message (the message is called Direct Transfer in the 3GPP specifications). The packet is forwarded by the RANAP layer of the RNC 24 to the RRC layer of the RNC 24. The relay function in the RNS 20 effectively strips the RANAP headers off and forwards the payload into the RRC protocol by using an appropriate primitive so that the RRC layer knows that this is an upper layer message that must be forwarded to the mobile station 6. The RNC 24 inserts an integrity checksum to the (RRC) message carrying the higher layer message in payload (the RRC message is called Direct Transfer in the 3GPP specifications). The RNC 24 may also cipher the message. This will be described in more detail hereinafter. The RNS 20 forwards the packet via the air interface to the mobile station 6.

In the mobile originated direction, the RRC layer of the mobile station 6 receives the higher layer message, encapsulates it into a RRC Direct Transfer message and adds a message authentication code to it before sending it to the RNS 20. The message is relayed from the RRC layer to the RANAP layer of the RNS 20. The RNS 20 checks associated information with the message to see if the packet has been integrity checked.

The integrity check procedure will now be described. Most radio resource control RRC, mobility management MM and session management SM (as well as other higher layer 3 protocol) information elements are considered sensitive and must be integrity protected. Due to this, an integrity function may be applied on most RRC signalling messages transmitted between the mobile station and the RNS 20. However, those RRC messages which are sent before the integrity key is known may be ignored. This integrity function uses an integrity algorithm with the integrity key IK to compute a message authentication code for a given message. This is carried out in the mobile station and the RNS which both have integrity key IK and the integrity algorithm.

Figure 3:
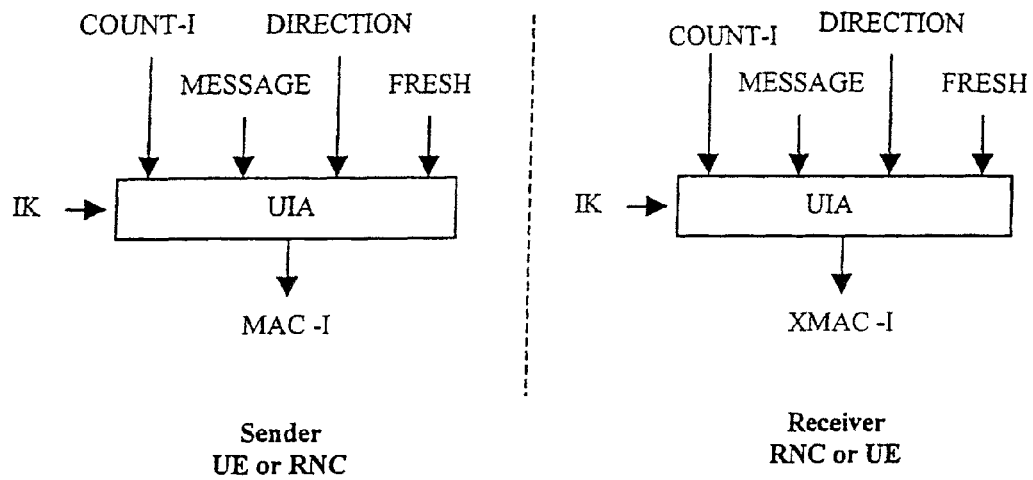
FIG. 3 illustrates schematically the integrity protection function.

Reference is made to FIG. 3 which illustrates the use of the integrity algorithm to calculate the message authentication code MAC-I.

The input parameters to the algorithm are the integrity key IK, a time or message number dependent input COUNT-I, a random value generated by the network FRESH, the direction bit DIRECTION and the signalling data MESSAGE. The latter input is the message or data packet. Based on these input parameters, a message authentication code for data integrity (MAC-I) is calculated by the integrity algorithm UIA. This code MAC-I is then appended to the message before sending over the air interface, either to or from the mobile station The receiver of that code and message also computes a message authentication code for data integrity XMAC-I on the message received using the same algorithm UIA. The algorithm UIA has the same inputs as at the sending end of the message. The codes calculated by the algorithm at the sending end (MAC-I) and at the receiving end (XMAC-I) should be the same if the data integrity of the message is to be verified.

The input parameter COUNT-I is a value incremented by one for each integrity protected message. COUNT-I consists of two parts: the hyperframe number (HFN) as the most significant part and a message sequence number as the least significant part. The initial value of the hyperframe number is sent by the mobile station to the network during a connection set-up. At connection release, the mobile station stores the greatest used hyperframe number from the connection and increments it by one. This value is then used as the initial HFN value for next connection. In this way the user is assured that no COUNT-I value is re-used (by the network) with the same integrity key for different connections. After an (re-) authentication procedure, when a new IK is generated and taken into use, the HFN value can be reset back to zero.

The input parameter FRESH protects the network against replay of signalling messages by the mobile station. At connection set-up the network generates a random value FRESH and sends it to the user. The value FRESH is subsequently used by both the network and the mobile station throughout the duration of a single connection. This mechanism assures the network that the mobile station is not replaying any old message authentication code MAC-I from previous connection.

The setting of the integrity key IK is as described herein. The key may be changed as often as the network operator wishes. Key setting can occur as soon as the identity of the mobile subscriber is known. The key IK is stored in the visitor location register and transferred to the RNC, when it is needed. The key IK is also stored in the mobile station until it is updated at the next authentication.

A key set identifier KSI is a number which is associated with the cipher and integrity keys derived during authentication procedure. It is stored together with the cipher and integrity keys in the MS and in the network. The key set identifier is used to allow key re-use during subsequent connection set-ups. The KSI is used to verify whether the MS and the network are to use the same cipher key and integrity key.

A mechanism is provided to ensure that a particular integrity key is not used for an unlimited period of time, to avoid attacks using compromised keys. Authentication which generates integrity keys is not mandatory at connection set-up.

The mobile station is arranged to trigger the generation of a new cipher key and an integrity key if the counter reaches a maximum value set by the operator and stored in the mobile station at the next RRC connection request message sent out. This mechanism will ensure that an integrity key and cipher key cannot be reused more times than the limit set by the operator.

It should be appreciated that there may be more than one integrity algorithm and information is exchanged between the mobile station and the radio network controllers defining the algorithm. It should be noted that the same algorithm should be used by the sender and receiver of messages.

When a mobile station wishes to establish a connection with the network, the mobile station shall indicate to the network which version or versions of the algorithm the MS supports. This message itself must be integrity protected and is transmitted to the RNC after the authentication procedure is complete.

The network shall compare its integrity protection capabilities and preferences, and any special requirements of the subscription of the mobile station with those indicated by the mobile station and act according to the following rules:

1) If the mobile station and the network have no versions of the algorithm in common, then the connection shall be released.
2) If the mobile station and the network have at least one version of the algorithm in common, then the network shall select one of the mutually acceptable versions of the algorithm for use on that connection.

Integrity protection is performed by appending the message authentication code MAC-I to the message that is to be integrity protected. The mobile station can append the MAC-I to messages as soon as it has received a connection specific FRESH value from the RNC.

If the value of the hyper-frame number HFN is larger or equal to the maximum value stored in the mobile station, the mobile station indicates to the network in the RRC connection set-up that it is required to initialise a new authentication and key agreement.

The RNC may be arranged to detect that new security parameters are needed. This may be triggered by (repeated) failure of integrity checks (e.g. COUNT-I went out of synchronisation), or handover to a new RNC does not support an algorithm selected by the old RNC, etc.

A new cipher key CK is established each time an authentication procedure is executed between the mobile station and the SGSN.

The integrity key IK may be changed if there is handoff of the mobile station from one base station to a different base station It should be appreciated that embodiments of the invention, the integrity check may only be commenced at any point after the connection has been set up as well as at attach.

It should be appreciated that with data connections, the connection may be open for relatively long periods of time or may even be permanently open.

It has been agreed that more than one signalling radio bearer, that is a radio bearer on the control plane that is a service offered by RLC, can be established between a mobile station or other user equipment 6 and the RNS 20. The current 3GPP specification proposes that up to four signalling radio bearers can be provided.

In the current 3GPP specification, two or more of the signalling radio bearers SRB may have the same input parameters to the integrity algorithm illustrated in FIG. 3. If all input parameters to the integrity algorithm are the same then the output is the same.

This current proposal, as mentioned previously, leaves open the possibility for an intruder or a 'man-in-the-middle' to repeat a signalling message from one signalling radio bearer on another signalling radio bearer. The COUNT-I value is specific to each signalling radio bearer and may be different on different signalling bearers. Consider the following scenario. A message has been sent on a first signalling radio bearer SRB1 with a COUNT value of 77. When the count value for a second signalling radio bearer SRB2 reaches 77, the unauthorised party can simply repeat the message sent earlier on SRB1 by using SRB2.

Typically, one single signalling message from a signalling radio bearer repeated in the second signalling radio bearer does not give a significant advantage to the 'man-in-the-middle' but it may be possible for the unauthorised party to repeat also a longer dialogue in order, for example, to set-up an additional call which the 'man-in-the-middle' can utilize and, thus, steal parts of the connection. A simpler 'repeat-attack' case would be that the unauthorised party could e.g. repeat a dialogue carried via SMS, the dialogue being e.g. money transaction.

With the current third generation proposals, this problem may only arise in a limited number of circumstances. This is due to the fact that the usage of the four signalling radio bearers (SRB) is limited. Only certain RRC messages can be sent on certain signalling radio bearers. The "repeat attack" scenario would be possible for a Non Access Stratum (NAS) message (CM/MM/SMS etc. messages carried in RRC Direct Transfer) or a NAS message dialogue between UE and SGSN/MSC. RRC Direct Transfer is a RRC message, which carries in payload all the NAS messages over the air interface. However, this problem could harm a mobile user as for example SMS messages could be adversely affected.

There are two basic solutions to the 'replay attack' problem. Firstly, different communication channels using the same secret key can coordinate the use of sequence numbers COUNT-I in such way that each sequence number is used at most once in any of the channels. This coordination may be very cumbersome or even impossible in some situations. It should be appreciated that when the embodiments are applied to the radio interface of the $3^{rd}$ generation cellular network UMTS, the communication channels may be called radio bearers.

As will be discussed in more detail, embodiments of the present invention use a solution where an additional parameter is used as an input to the calculation of the message authentication code MAC-I. The value of this parameter is unique at least to each communication channel which uses the same secret key. The value may be unique also to all communication channels within one connection between the user equipment UE 6 and RNS 20.

In a further embodiment of the present invention, the problem is avoided by ensuring that same integrity key is never used for different parallel communication channels.

Figure 4:
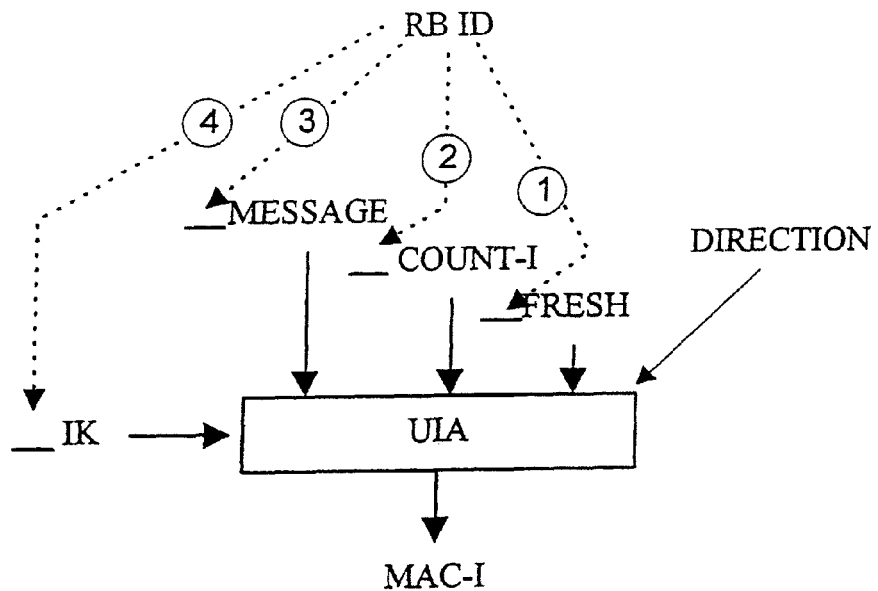
FIG. 4 shows the integrity protection function as modified in accordance with embodiments of the present invention.

With reference to FIG. 4, the modifications to the known integrity protection function embodying the present invention are described. These modifications do not cause any changes to the actual integrity algorithm UIA.

A communication channel specific parameter is added as input to the integrity protection algorithm. In the 3GPP specifications, this communication channel specific parameter is the radio bearer identification (RB ID). In one example of an application of the present invention, the radio bearer identification represents the identity of the signalling radio bearer in the proposed WCDMA third generation system and can be a number between 0 and 3. It should be noted that the used communication channel specific parameter depends on the protocol layer where the message authentication code is calculated. Still using 3GPP specification as an example, if the message authentication code would be added in the RLC protocol, the parameter would be a logical channel (see FIG. 2) identity. As another possible example, if the integrity protection would be performed in the PDCP protocol layer or in the RRC protocol layer, the additional parameter would be a radio bearer (see FIG. 2) identity. It should be appreciated that when discussing the control plane part of the protocol stack, the terms signalling radio bearer identity and radio bearer identity are equivalent.

Since the identity of the signalling radio bearer is known by both the sender and the receiver, that is the user equipment UE 6 and the RNS 20, it is not necessary to send the identity information explicitly over the radio interface.

FIG. 4 illustrates the possible places where the new parameter can be included without modifying the integrity algorithm UIA. Since the sender and receiver are similar when looking from the input parameter viewpoint (see FIG. 3), only one side in shown in FIG. 4. It should be appreciated that the receive and the transmit parts will perform the same algorithm. As can be seen from FIG. 4, the preferred embodiments include the new parameter by appending it (as a string) to one or more of the existing algorithm input parameters.

In one embodiment the signalling radio bearer identification RB IB is made part of the input parameters FRESH or COUNT-I. This is illustrated with numbers '1' and '2' in FIG. 4, respectively. In practice, the FRESH and COUNT-I parameters would incorporate both FRESH or COUNT-I information and the identification information. For example if the FRESH value has n bits the FRESH information would be represented by a bits and the identification information by b bits where a+b=n. This would mean in effect shortening the FRESH parameter. The same modification may be made to the COUNT-I parameter. In one modification, part of the signalling radio bearer identification may be provided by the COUNT-I parameter and part by the FRESH parameter. However, if the COUNT-I is made shorter it may take shorter time for it to 'wrap around' i.e. to reach the maximum value and come back to zero. If the FRESH parameter is shortened, it may be that the probability of repeating the value by accident (it is randomly chosen) increases.

In a further embodiment the signalling radio bearer id is made part of the integrity key IK. This is illustrated with number '4' in FIG. 4. For example if the IK value has n bits the IK information would be represent by a bits and the identification information by b bits where a+b=n. However, if the key IK is shorter there is increased probability to simply guess the key.

In a further embodiment of the present invention, the identity of the signalling radio bearer may be incorporated into the MESSAGE that is fed into the integrity algorithm. This is illustrated with number '3' in FIG. 4. Since the identity of the signalling radio bearer is known by both the sender and the receiver, that is the mobile station and the RNS 20, it is not necessary to send the identity information over the radio interface with the actual MESSAGE. For example, if the MESSAGE has n bits the and the identity RB ID has i bits, the actual 'MESSAGE' that would be fed into the integrity algorithm would have n+i bits. Thus, instead of just the MESSAGE alone being input to the integrity algorithm, the bit string fed into the integrity algorithm would become signalling radio bearer identity and the MESSAGE. This solution has no impact on the security issues (e.g. counter lengths) related to the integrity algorithm. This means that no parameter that is fed to the algorithm is made shorter:

In some embodiments, it is possible to divide the identification information between more than one input.

Figure 5:
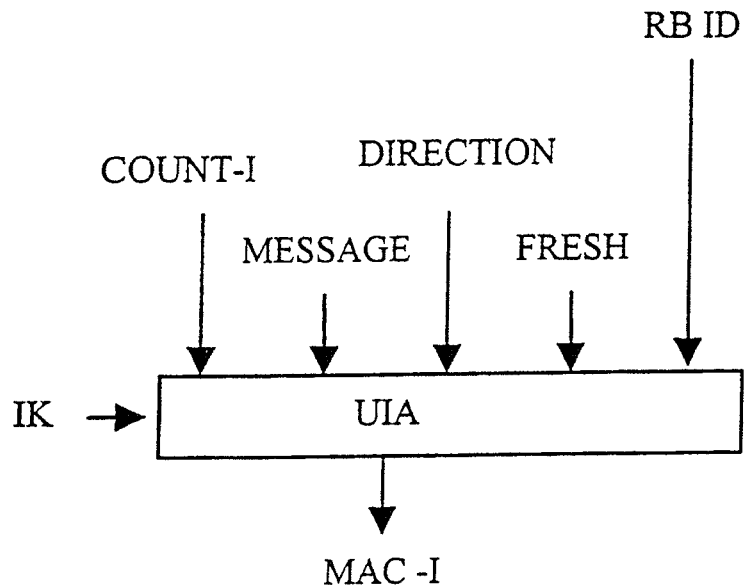
FIG. 5 shows the integrity protection function as modified in accordance with a further embodiment of the invention.

FIG. 5 illustrates a further embodiment of the invention, this embodiment having effect to the actual integrity algorithm UIA. In this embodiment the integrity algorithm is provided with an additional parameter, as shown in FIG. 5. In this example, when integrity protection is performed in the RRC protocol layer, the additional parameter is a (signalling) radio bearer identification RB ID, which is unique to the (signalling) radio bearer. This parameter is input separately and is used in the calculation performed by the integrity algorithm UIA.

Figure 6:
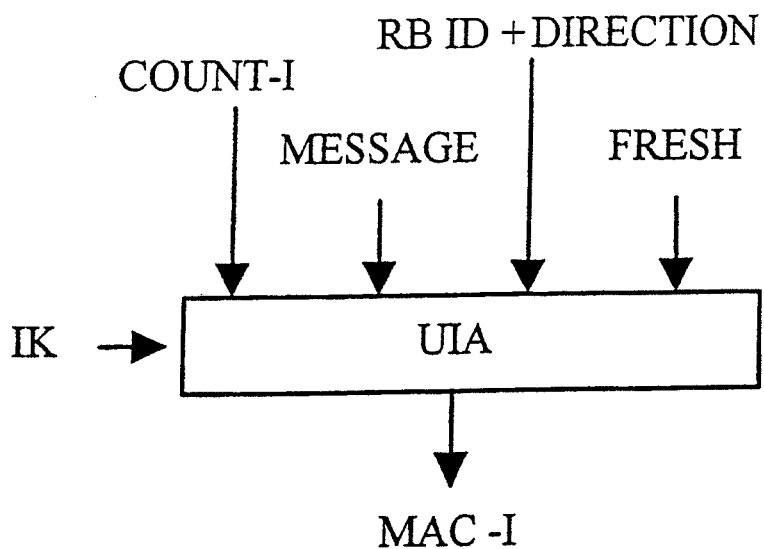
FIG. 6 shows a further embodiment of the present invention.

FIG. 6 illustrates a further embodiment of the invention, this embodiment having effect to the actual integrity algorithm UIA. In this embodiment the new parameter bearer id (RB ID) is combined with the parameter DIRECTION. This embodiment would effectively make the existing i.e. 'old' DIRECTION parameter longer and thus have effect on the actual integrity algorithm UIA.

In an alternative embodiment, a unique integrity key IK is produced for each radio bearer. This may be achieved by modifying the authentication procedure of an upper layer L3 which supports mobility management MM and session management SM in the proposed UMTS specifications. As was briefly explained above, the mobility management function manages the location of the mobile station, that is attachment of the mobile station to the network and authentication. The integrity algorithm performed on each of the signalling radio bearers during a modified authentication procedure may provide unique results, preventing the type of attack outlined previously.

Figure 7:
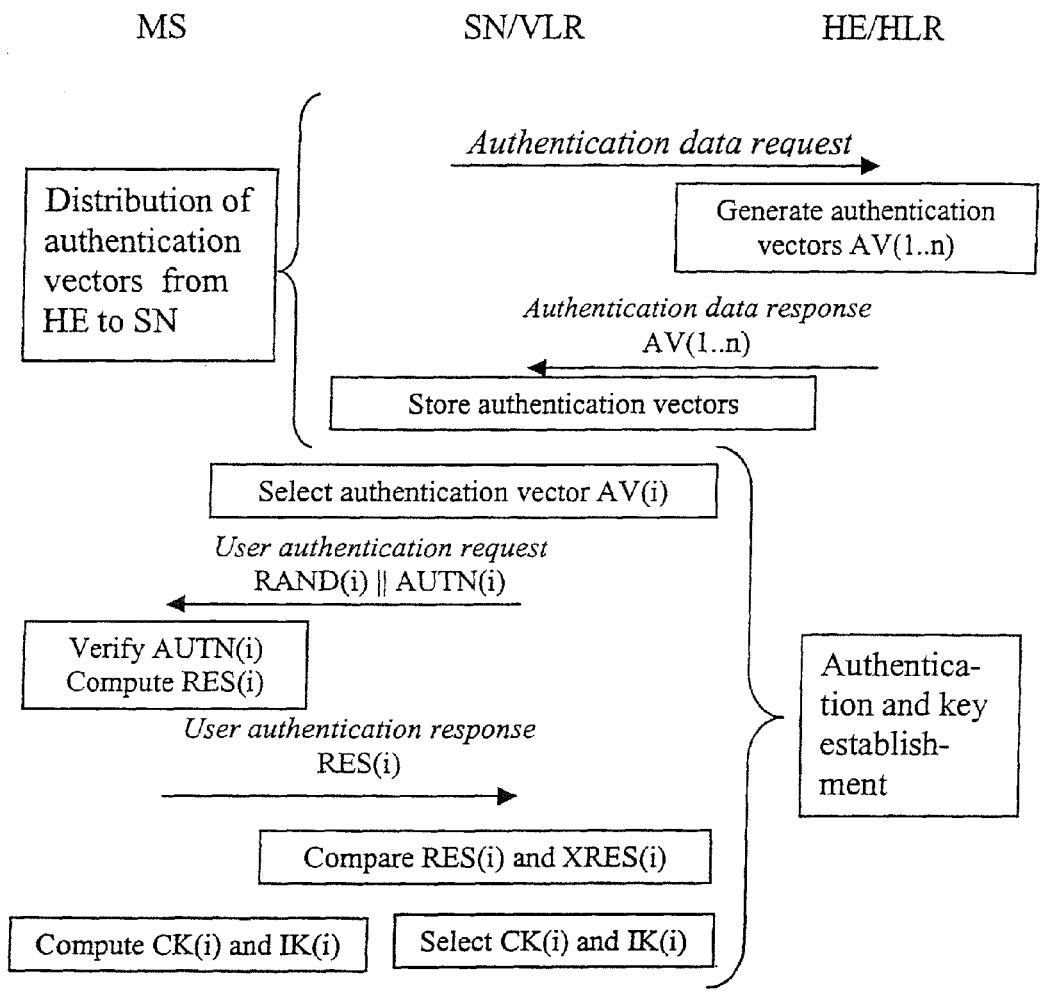
FIG. 7 shows an authentication and key agreement procedure.
Figure 8:
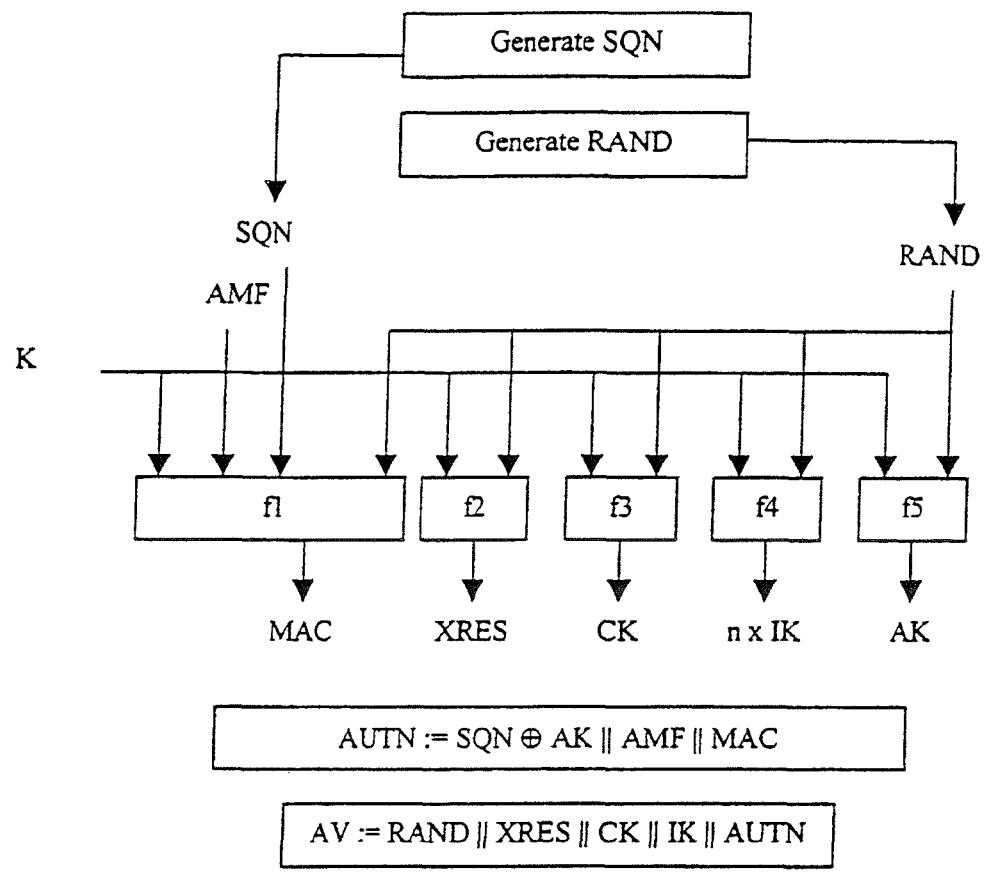
FIG. 8 shows generation of authentication vectors.
Figure 9:
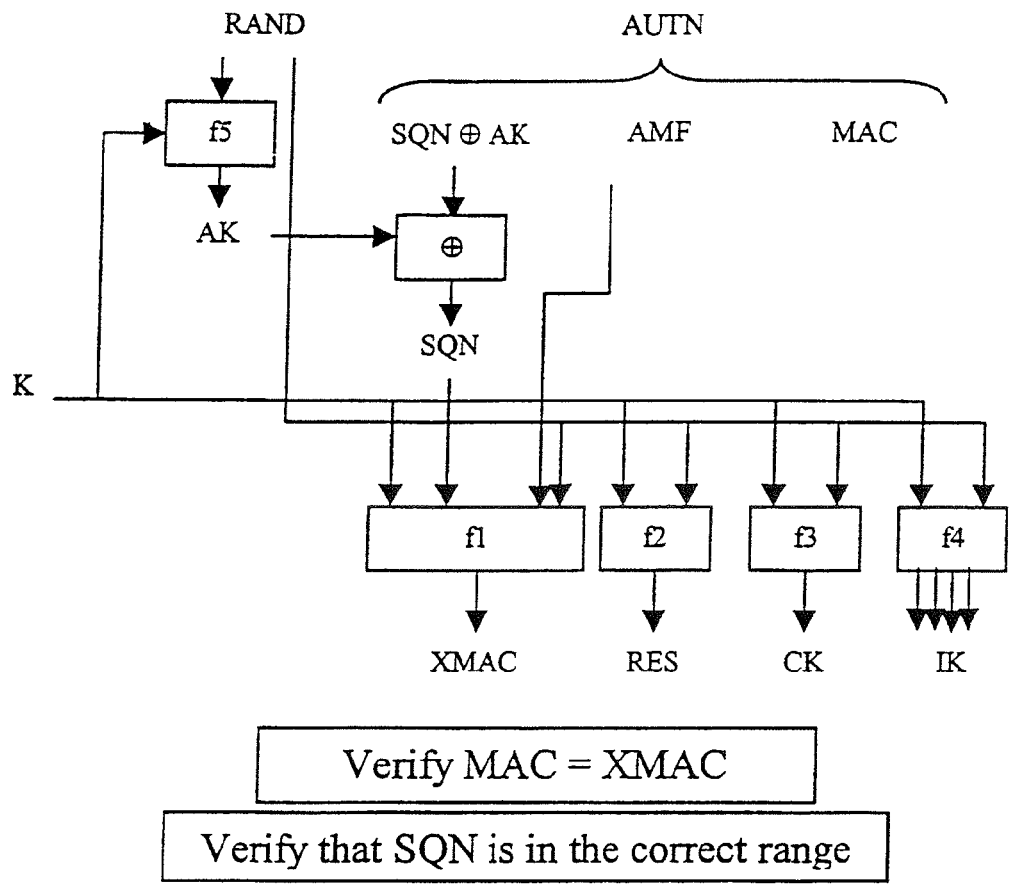
FIG. 9 shows an example of user authentication function in USIM in accordance with an embodiment of the present invention.

Reference will now be made to FIGS. 7 to 9 showing possible authentication and key agreement procedures. The described mechanisms achieve mutual authentication by the user and the network showing knowledge of a secret key K which is shared between and available only to the User Services Identity Module USIM and the Authentication Centre AuC in the user's Home Environment HE. In addition, the USIM and the HE keep track of counters $SEQ_{MS}$ and $SEQ_{HE}$ respectively to support network authentication.

The procedure may be designed such that it is compatible with e.g. the current GSM security architecture and facilitate migration from the GSM to the UMTS. The method is composed of a challenge/response protocol identical to the GSM subscriber authentication and key establishment protocol combined with a sequence number-based one-pass protocol for network authentication derived from the ISO standard ISO/IEC 9798-4. Before explaining the formation of the integrity keys, an authentication and key agreement mechanism will be discussed. An overview of a possible authentication and key agreement mechanism is shown in FIG. 7. FIG. 8 shows a possible procedure for the generation of authentication vectors.

Upon receipt of a request from the VLR/SGSN, the HE/AuC sends an ordered array of n authentication vectors (the equivalent of a GSM "triplet") to the VLR/SGSN. Each authentication vector consists of the following components: a random number RAND, an expected response XRES, a cipher key CK, an integrity key IK and an authentication token AUTN. Each authentication vector is good for one authentication and key agreement between the VLR/SGSN and the USIM.

When the VLR/SGSN initiates an authentication and key agreement, it selects the next authentication vector from the array and sends the parameters RAND and AUTN to the user. The USIM checks whether AUTN can be accepted and, if so, produces a response RES which is sent back to the VLR/SGSN. The USIM also computes CK and IK. The VLR/SGSN compares the received RES with XRES. If they match the VLR/SGSN considers the authentication and key agreement exchange to be successfully completed. The established keys CK and IK will then be transferred by the USIM and the VLR/SGSN to the entities which perform ciphering and integrity functions. In the proposed UMTS system, these entities may preferably be some of the radio interface protocols described in FIG. 2. The entities are located preferably in the User Equipment UE and in the Radio Network Controller RNC.

VLR/SGSNs can offer secure service even when HE/AuC links are unavailable by allowing them to use previously derived cipher and integrity keys for a user so that a secure connection can still be set up without the need for an authentication and key agreement. Authentication is in that case based on a shared integrity key, by means of data integrity protection of signalling messages.

The authenticating parties shall be the AuC of the user's HE (HE/AuC) and the USIM in the user's mobile station. The mechanism may consist of the following procedures:

Distribution of authentication information from the HE/AuC to the VLR/SGSN. The VLR/SGSN is assumed to be trusted by the user's HE to handle authentication information securely. It is also assumed that the intra-system links between the VLR/SGSN to the HE/AuC are adequately secure. It is further assumed that the user trusts the HE.

Mutual authentication and establishment of new cipher and integrity keys between the VLR/SGSN and the MS.

Distribution of authentication data from a previously visited VLR to the newly visited VLR. It is assumed that the links between VLR/SGSNs are adequately secure.

The purpose of the distribution of authentication data from HE to SN is to provide the VLR/SGSN with an array of fresh authentication vectors from the user's HE to perform a number of user authentications. The VLR/SGSN invokes the procedures by requesting authentication vectors to the HE/AuC. The authentication data request shall include a user identity. If the user is known in the VLR/SGSN by means of the IMUI, the authentication data request shall include the IMUI. If the user is identified by means of an encrypted permanent identity, the HLR-message from which the HE can derive the IMUI may be included instead. In that case, this procedure and the procedure user identity request to the HLR are preferably integrated.

Upon the receipt of the authentication data request from the VLR/SGSN, the HE may have pre-computed the required number of authentication vectors and retrieve them from the HLR database or may compute them on demand. The HE/AuC sends an authentication response back to the VLR/SGSN that contains an ordered array of n authentication vectors AV(1 . . . n). The HE/AuC generates a fresh sequence number SQN and an unpredictable challenge RAND. For each user the HE/AuC keeps also track of a counter that is $SQN_{HE}$.

The mechanisms for verifying the freshness of sequence numbers in the USIM shall to some extent allow the out-of-order use of sequence numbers. This is to ensure that the authentication failure rate due to synchronisation failures is sufficiently low. This requires the capability of the USIM to store information on past successful authentication events (e.g. sequence numbers or relevant parts thereof). The mechanism shall ensure that a sequence number can still be accepted if it is among the last x=50 sequence numbers generated. This shall not preclude that a sequence number is rejected for other reasons such as a limit on the age for time-based sequence numbers.

The same minimum number x needs to be used across the systems to guarantee that the synchronisation failure rate is sufficiently low under various usage scenarios, in particular simultaneous registration in the CS- and the PS-service domains, user movement between VLRs/SGSNs which do not exchange authentication information, super-charged networks.

The use of SEQHE may be specific to the method of generation sequence numbers. An authentication and key management field AMF may be included in the authentication token of each authentication vector.

Subsequently the following values can be computed:
a message authentication code $MAC=f1_K$ (SQN||RAND||AMF) where f1 is a message authentication function;
an expected response $XRES=f2_K$ (RAND) where f2 is a (possibly truncated) message authentication function;
a cipher key $CK=f3_K$ (RAND) where f3 is a key generating function;
an integrity key $IK=f4_K$ (RAND) where f4 is a key generating function;
an anonymity key $AK=f5_K$ (RAND) where f5 is a key generating function or f5≡0.

According to the embodiments of the present invention, more than one IK is generated. This can be achieved, for example, by modifying the f4 function such that it produces the desired number of IKs (e.g. 4: see FIG. 9). A possibility is to specify that the f4 function must be triggered several times during the generation of an authentication vector. This can be implemented e.g. by feeding in the second round the first produced IK[1] as input to the f4 function instead of a new RAND. In the third 'round' the IK[2] produced in the second round would be fed into f4 function to obtain third integrity key IK[3]. A possibility is also to input a desired number of RANDS to the function f4. Thus it is possible to produce as many IK:s as necessary for the system in question. For example, in the UMTS system according to 3GPP Release'99 specifications, four integrity keys would be needed.

The authentication token AUTN=SQN⊕AK||AMF||MAC may then be constructed. The AK is an anonymity key used to conceal the sequence number as the latter may expose the identity and location of the user. The concealment of the sequence number is to protect against passive attacks only. If no concealment is needed, then f5≡0.

The purpose of the authentication and key agreement procedure is to authenticate the user and establish a new pair of cipher and integrity keys between the VLR/SGSN and the MS. During the authentication, the user verifies the freshness of the authentication vector that is used. The VLR/SGSN invokes the procedure by selecting the next unused authentication vector from the ordered array of authentication vectors in the VLR database. The VLR/SGSN sends to the user the random challenge RAND and an authentication token for network authentication AUTN from the selected authentication vector. Upon receipt the user proceeds as shown in FIG. 9.

Upon receipt of RAND and AUTN the user first computes the anonymity key AK=$f5_K$ (RAND) and retrieves the sequence number SQN=(SQN⊕AK)⊕AK. Next the user computes XMAC=$f1_K$ (SQN||RAND||AMF) and compares this with MAC which is included in AUTN. If they are different, the user sends user authentication reject back to the VLR/SGSN with an indication of the cause and the user abandons the procedure. Next the USIM verifies that the received sequence number SQN is in the correct range.

According to an embodiment of the present invention, the USIM generates more than one IK instead of generating only one IK. As explained above. This can be achieved, for example, by modifying the f4 function, by specifying that the f4 function must be triggered several times during the generation of an authentication vector or by input of a desired number of RANDs into the f4 function. This may require that the network (SN/VLR) sends the required number of RANDs and AUTNs to the UE and that the UE may need to produce also a RES for each RAND and return all the produced RESs to the network, as was described above for the case of one RAND+AUTN.

Embodiments of the present invention may be used in any system enabling non-ciphered signalling and utilising integrity checksums in at least two parallel radio bearers.

The embodiments of the present invention have been described in the context of a wireless cellular telecommunications network. However, alternative embodiments of the present invention may be used with any other type of communications network wireless or otherwise. Embodiments of the present invention may be used any form or communication where integrity checks or the like are provided with a plurality of radio bearers or the like in parallel.

The invention claimed is:

1. A method comprising:
   calculating, by a processor, an integrity output using a plurality of input values, at least one of the input values comprising information relating to an identity of a channel, each of a plurality of channels having a different identity, at least one of the input values being identical for the plurality of channels, wherein the identity of the channel is a radio bearer identity.

2. The method according to claim 1, further comprising:
   combining information relating to the identity of the channel with at least one other input value,
   wherein the information relating to the identity of the channel is combined with one or more of: a fresh value, a count value, and integrity key, a direction value, and a message value.

3. The method according to claim 1, further comprising:
   combining information relating to the identity of the channel with at least one other input value,
   wherein the combined information comprises a first part allocated to the identity of the bearer and a second part allocated to at least one other input value.

4. The method according to claim 1, wherein the radio bearer identity is a signaling radio bearer identity.

5. An apparatus comprising:
   a calculator module configured to calculate an integrity output using a plurality of input values, at least one of the input values comprising information relating to an identity of a channel, each of a plurality of channels having a different identity, at least one of the input values being identical for the plurality of channels, wherein the identity of the channel is a radio bearer identity.

6. The apparatus according to claim 5, further comprising:
   combining information relating to the identity of the channel with at least one other input value,
   wherein the information relating to the identity of the channel is combined with one or more of: a fresh value, a count value, and integrity key, a direction value, and a message value.

7. The apparatus according to claim 5, further comprising:
   combining information relating to the identity of the channel with at least one other input value,
   wherein the combined information comprises a first part allocated to the identity of the bearer and a second part allocated to at least one other input value.

8. The apparatus according to claim 5, wherein the radio bearer identity is a signaling radio bearer identity.

9. A computer program embedded on a non-transitory computer readable medium, the non-transitory computer readable medium configured to control a processor to perform operations comprising:
   calculating an integrity output using a plurality of input values, at least one of the input values comprising information relating to an identity of a channel, each of a plurality of channels having a different identity, at least one of the input values being identical for the plurality of channels, wherein the identity of the channel is a radio bearer identity.

10. The computer program embedded on computer readable medium according to claim 9, further comprising:
    combining information relating to the identity of the channel with at least one other input value,
    wherein the information relating to the identity of the channel is combined with one or more of: a fresh value, a count value, and integrity key, a direction value, and a message value.

11. The computer program embedded on computer readable medium according to claim 9, further comprising:
    combining information relating to the identity of the channel with at least one other input value,
    wherein the combined information comprises a first part allocated to the identity of the bearer and a second part allocated to at least one other input value.

12. The computer program embedded on computer readable medium according to claim 9, wherein the radio bearer identity is a signaling radio bearer identity.

13. An apparatus comprising:
    at least one processor; and
    at least one memory including computer program code, the at least one processor, the at least one memory, and the computer program code configured to cause the apparatus to at least:
    calculate an integrity output using a plurality of input values, wherein at least one of the input values comprising information relating to an identity of a channel, wherein each of a plurality of channels having a different identity, wherein at least one of the input values being identical for the plurality of channels, and wherein the identity of the channel is a radio bearer identity.

* * * * *